United States Patent
Fujimura et al.

(10) Patent No.: US 7,496,936 B2
(45) Date of Patent: Feb. 24, 2009

(54) DISK APPARATUS

(75) Inventors: Nobuhiko Fujimura, Tokyo (JP); Kazuo Yokota, Tokyo (JP); Shinichi Fujisawa, Tokyo (JP)

(73) Assignee: TEAC Corporation, Tokyo (JP)

( * ) Notice: Subject to any disclaimer, the term of this patent is extended or adjusted under 35 U.S.C. 154(b) by 617 days.

(21) Appl. No.: 11/099,437

(22) Filed: Apr. 5, 2005

(65) Prior Publication Data

US 2005/0223398 A1 Oct. 6, 2005

(30) Foreign Application Priority Data

Apr. 6, 2004 (JP) .............................. 2004-112206

(51) Int. Cl.
*G11B 17/03* (2006.01)

(52) U.S. Cl. ...................................................... 720/646
(58) Field of Classification Search ................ 720/646, 720/623, 647, 655; 369/75.11, 77.11; 206/308.1, 206/313

See application file for complete search history.

(56) References Cited

U.S. PATENT DOCUMENTS

| 5,701,216 | A  | * | 12/1997 | Yamamoto et al. ........ 360/99.02 |
| 6,363,045 | B2 | * | 3/2002 | Sato ............................ 720/647 |
| 6,411,583 | B1 | * | 6/2002 | Yamamoto et al. ........... 720/647 |
| 6,874,153 | B2 | * | 3/2005 | Kabasawa .................... 720/623 |
| 6,910,217 | B2 | * | 6/2005 | Kan-o ......................... 720/646 |
| 6,944,871 | B2 | * | 9/2005 | Kabasawa .................... 720/647 |
| 7,225,450 | B2 | * | 5/2007 | Kim ............................ 720/647 |
| 2002/0044517 | A1 | | 4/2002 | Kan-o ......................... 369/77.1 |
| 2007/0186223 | A1 | * | 8/2007 | Mitsumoto ................... 720/646 |

FOREIGN PATENT DOCUMENTS

JP    2003-263855    9/2003

* cited by examiner

*Primary Examiner*—Allen T Cao
(74) *Attorney, Agent, or Firm*—Weingarten, Schurgin, Gagnebin & Lebovici LLP

(57) ABSTRACT

In order to alleviate the contact pressure on a contact portion between both surfaces of a disc D and felts 25 in disc ejection, an upper end and a lower end of a slot 3*a* on the backside of a front bezel 3 are formed with an upper recess 27 and a lower recess 28 that receive the pushed-over upper and lower felts 25. Also, the pushed-over felts 25 are received in the upper recess 27 and the lower recess 28, so that the contact pressure on the contact portion between both surfaces of the disc D and the felts 25 can be decreased.

4 Claims, 10 Drawing Sheets

DISK APPARATUS

This application claims priority to a Japanese application No. 2004-112206 filed Apr. 6, 2004.

BACKGROUND OF THE INVENTION

1. Field of the Invention

The present invention relates to a disc apparatus which drives an optical disc (for example, CD-R/RW, DVD-R/-RW/ RAM/+R/+RW, etc.), as a recording medium which records a large amount of information, in information equipment such as various computer systems, and in particular, to a disc apparatus which facilitates the insertion and ejection of discs.

2. Description of the Related Art

Generally, a disc apparatus built in a personal computer (hereinafter referred to as 'PC') or the like has a disc tray for loading a disc that is configured to advance and retreat. Also, a disc loaded in the disc tray is driven in a main body of the disc apparatus to record or reproduce information.

On the other hand, as another type of disc apparatus that does not utilize a disc tray, a so-called slot-in type disc apparatus is also frequently employed. This type of disc apparatus is suitable to make PCs slim and small. Since the slot-in type disc apparatus does not utilize a disc tray in loading or unloading a disc to or from a main body of the apparatus, when an operator inserts over half of a disc into a slot, a loading mechanism of the apparatus body is then operated to load the disc automatically.

In the slot-in type disc apparatus, the slot is covered with felt for preventing entering of dust that may affect the recording or reproducing of data when entered from the slot. The felts are attached to, for example, the inside of a front panel (front bezel) provided with the slot, and are fixed to the upper and lower portions of the slot respectively. Also, a disc inserted through the slot passes through a long horizontal slit for disc-insertion formed in the middle of the felt, and enters the inside of the apparatus. When a disc passes through the horizontal slit for disc-insertion, the felt is deformed to open and the disc passes through the horizontal slit in contact with the felt. That is, the disc pushes the felt open through the horizontal slit to pass through the slit. After the passage of the disc, the deformed felt is returned to the original state to cover the slot again.

Among conventional felts attached to the front bezel of the slot-in type disc apparatus, some are attached to front bezels having a plurality of vertical slits orthogonal to the horizontal slit as well as the horizontal slit. The vertical slits are formed to make the felt pushed over easily in the disc moving direction so as to reduce the drag resistance between the disc and the felt when the disc pushes the horizontal slit open to pass therethrough (for example, Japanese Unexamined Patent Application No. 2002-123995).

SUMMARY OF THE INVENTION

As described above, in the conventional slot-in type disc apparatus, since both surfaces of the disc come into contact with the felt when the disc passes by the felt, the contact friction is applied to both surfaces of the disc throughout the contact portion. Therefore, there is a problem in that sliding scratches may happen on the disc surface on which signals are recorded, and thus errors may be caused when information is recorded or reproduced.

In addition, in the conventional slot-in type disc apparatus, when an operator inserts a disc through the slot, the adjustment of the height of the disc is facilitated as the vertical width of the disc is approximate to the disc thickness. Accordingly, it is required to make the vertical width of the slot in which a disc is inserted as small as possible and to control the height of the disc by the slot at the time of insertion of the disc.

However, the felt is deformed to roll into the slot along with the disc and is then pushed over in the ejection direction when the disc pushes the felt open and then passes through the slot in the disc ejection. In this case, if the vertical width of the slot is small, the felt is strongly compressed between the contact portion with the disc and the slot. That is, a large contact pressure is applied to both disc surfaces. As a result, a friction force applied to the disc becomes large so as to exert an excessive load on a disc unloading mechanism of the disc apparatus. In addition, when the friction force becomes larger than the disc unloading force of the apparatus, such a problem may happen that the disc halts while passing through the slot without being completely unloaded.

The present invention has been made in view of the above problems in the related art. It is therefore an object of the present invention to provide a disc apparatus that prevents the scratches from happening on the disc surface on which signals are recorded in the insertion and ejection of the disc, and that prevents an excessive load from being exerted on the disc unloading mechanism especially in the disc ejection so as to facilitate the insertion and ejection of the disc.

A first aspect of the present invention is a disc apparatus in which a disc insertion opening is covered with a flexible sheet, and a disc is inserted or ejected by pushing over the flexible sheet. An edge of the disc insertion opening is provided with a recess for receiving the flexible sheet pushed over by the contact of the disc.

A second aspect of the present invention is a disc apparatus according to the first aspect of the present invention, further comprising a front bezel having the disc insertion opening, in which the flexible sheet is disposed on the backside of the front bezel.

A third aspect of the present invention is a disc apparatus according to the first aspect of the present invention, further comprising a front bezel having the disc insertion opening, in which the recess is formed in the front bezel.

A fourth aspect of the present invention is a disc apparatus according to the first aspect of the present invention, further comprising a front bezel having the disc insertion opening, in which the flexible sheet is disposed on the backside of the front bezel, the recess is formed in the front bezel, and the disc insertion opening of the front bezel has its backside height larger than its front side height.

A fifth aspect of the present invention is a disc apparatus in which a disc insertion opening is covered with a flexible sheet, and a disc is inserted and ejected by pushing over the flexible sheet. The flexible sheet is divided, correspondingly to longitudinal positions of the disc insertion opening, into a first portion that comes into contact with only an upper surface of the disc and a second portion that comes into contact with only a lower surface of the disc when the flexible sheet is pushed over by the contact of the disc.

A sixth aspect of the present invention is a disc apparatus in which a flexible sheet covers a disc insertion opening having its middle portion bulged downward than its both ends, and a disc is inserted and ejected by pushing over the flexible sheet. The flexible sheet comes into contact with both surfaces of the disc at the both ends of the disc insertion opening, and the flexible sheet is divided, correspondingly to longitudinal positions of the disc insertion opening in portions other than the both ends, into a first portion that comes into contact with only an upper surface of the disc and a second portion that comes into contact with only a lower surface of the disc when the flexible sheet is pushed over by the contact of the disc.

A seventh aspect of the present invention is the disc apparatus according to the sixth aspect of the present invention, in which the edges of the both ends of the disc insertion opening are provided with recesses that receive the flexible sheet pushed over by the contact of the disc in disc ejection.

According to the present invention, the disc surface on which signals are recorded can be prevented from being scratched in the insertion and ejection of the disc, and also the insertion and ejection of the disc can be facilitated by preventing an excessive load from exerting on a disc unloading mechanism in the disc ejection.

BRIEF DESCRIPTION OF THE DRAWINGS

FIG. 4A is a cross-sectional view of the front bezel showing the state of a felt before a disc ejection, and FIG. 4B is a cross-sectional view of the front bezel showing the state of the felt in the middle of the disc ejection, and FIG. 4C is a cross-sectional view of the front bezel showing the state of the felt right after the disc ejection;

FIG. 8A is a cross-sectional view of the front bezel at the upper felt in the middle of the disc ejection operation, and FIG. 8B is a cross-sectional view of the front bezel at the lower felt in the middle of the disc ejection operation;

DESCRIPTION OF THE PREFERRED EMBODIMENTS

Hereinafter, a disc apparatus according to an embodiment of the present invention will be described with reference to the accompanying drawings.

Figure 1:
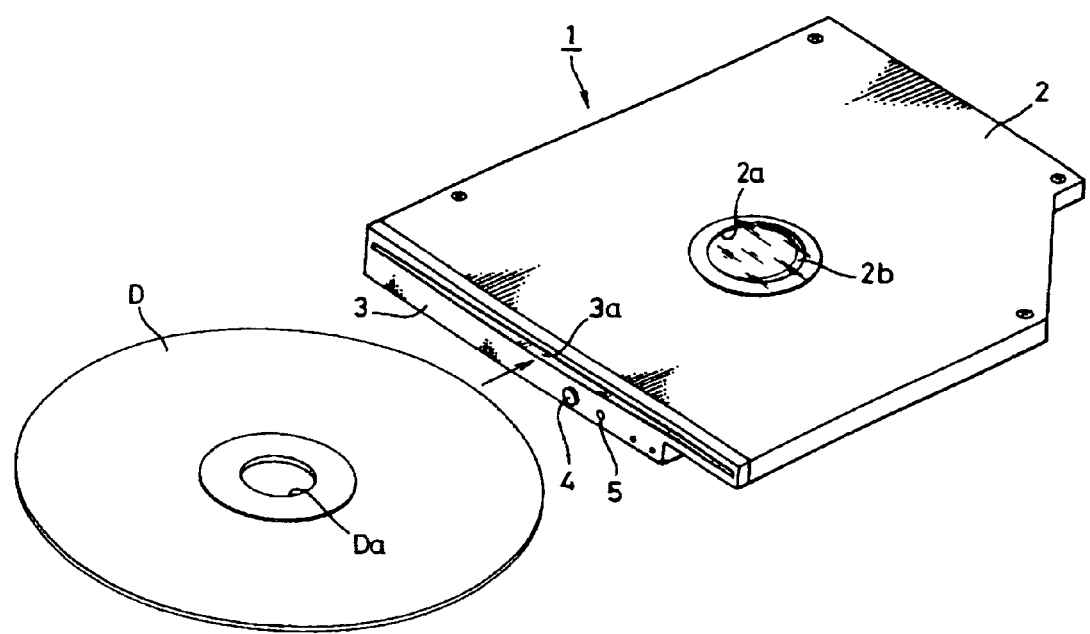
FIG. 1 is a perspective view showing the appearance of a disc apparatus related to an embodiment of the present invention.

FIG. 1 is a view showing the appearance of a slot-in type disc apparatus 1 in which the present invention is embodied. An opening 2a is formed at the center of a top plate of a chassis case 2 constructed in its shielded state, and inwardly protruding protrusion 2b are formed at a circumferential edge of the opening 2a. A front bezel 3 is attached to a front end of the chassis case 2, and the front bezel 3 includes a slot 3a into which a standardized outer-diameter disc D is inserted; a push button 4 for instructing the unloading of the disc D received in the apparatus to the outside of the apparatus, and an indicator 5 for indicating an operating state of the disc apparatus 1.

Figure 2:
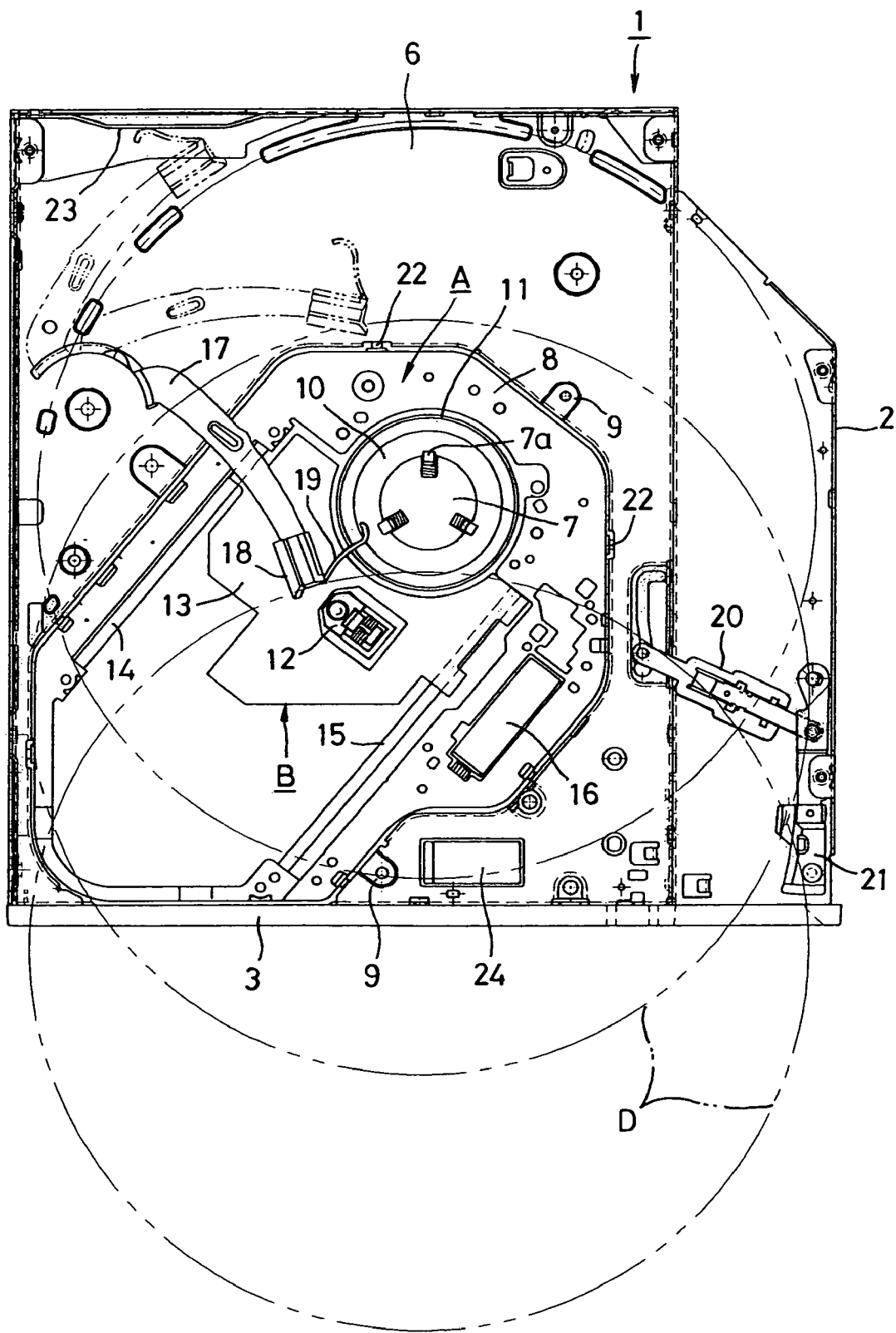
FIG. 2 is a plan view showing an internal structure of the disc apparatus in FIG. 1 when a disc D is inserted.

FIG. 2 is a plan view of the disc apparatus 1 with the top plate of the chassis case 2 removed. A base panel 6 is disposed within the chassis case 2, and a drive unit A for driving the disc D is provided in a state disposed to incline downward from the center of the base panel 6. The drive unit A has a frame member 8 moving up and down in its horizontal state and connected to the base panel 6 at a plurality of locations (three locations in the present embodiment) by a well-known shock-absorbing support structure 9 in order to clamp a center hole Da of the disc D or to release clamping of the disc D. Also, a driving structure of the frame member 8 may be a cantilevered structure in which one end is journalled and the front end is swung to move a clamping head 7 up and down.

The clamping head 7 is disposed at a location corresponding to the center of the disc D staying still after loading in the front end of the frame member 8. The clamping head 7 is integrally formed with a turntable 10 and is fixed to a driving shaft of a spindle motor 11 disposed right below the clamping head 7. The spindle motor 11 rotatingly drives the disc D clamped by the clamping head 7 for recording or reproducing of information.

Next, the reference numeral B indicates a head unit supported by the frame member 8. A carrier block 13 for reciprocating an optical pickup 12 in the radial direction of the disc D is supported by guide shafts 14 and 15 having its both ends fixed to the frame member 8, and is reciprocated by a thread motor 16 and a gear unit (not shown).

The reference numeral 17 indicates a disc support arm that guides the disc D into the apparatus and pushes out the disc D to the outside of the apparatus. A stopper 19 for preventing an erroneous insertion and stopping the entry of a small-diameter disc Ds having a diameter other than the standardized outer diameter when a small-diameter disc Ds is erroneously inserted is attached to a front end of the disc support arm 17. The front circumferential edge of the disc Ds inserted erroneously comes into contact with the stopper 19 so as to stop the insertion of the disc Ds. Also, a holder 18 for supporting an end of the disc D is fixed to a front end of the disc support arm 17.

In addition, in the rear surface of the base panel 6, a rack main body (not shown), a conveyance mechanism, is advanced to or retreated from the chassis case 2 by driving a loading motor 24. Advancing or retreating the rack main body drives a link arm (not shown) linked to the rack main body, and thus the disc support arm 17 linked to the link arm swings. At the same time, a leading arm 21 swings by a lever arm 20 connected to the rack main body on the base panel shown in FIG. 2.

Next, an operational aspect of the disc apparatus 1 when an operator inserts the disc D will be described. In the structure shown in FIG. 2, when the operator inserts the disc D, the holder 18 of the disc support arm 17 and the leading arm 21 guide the disc D into the apparatus 1. In FIG. 2, the disc support arm 17 illustrated by a solid line is in an initial state in which the front end of the disc D is held and supported by a receiving end of the holder 18 formed at the front end of the disc support arm 17 when the operator inserts the disc D from the slot 3a.

If the operator pushed the disc D into the apparatus in the initial state, the disc support arm 17 swings backward. Also, an angular position detecting switch (not shown) of the disc support arm 17 disposed in the rear surface of the base panel 6 detects a driving-starting position.

When the driving-starting position is detected, the loading motor 24 is driven to start to drive the conveyance mechanism. Then, the rack main body begins to retreat, and the lever arm 20 is pulled back with the retreat of the rack main body, to swing the leading arm 21. Then, the leading arm 21 and the disc support arm 17 chucks the disc D.

When the rack main body further retreats, the disc support arm 17 and the leading arm 21 swing backward so as to load the disc D to a location where the center hole Da of the disc D is on the clamping head 7. In addition, so far, the holder 18 and the leading arm 21 chuck and hold the disc D together, and the disc support arm 17 and the leading arm 21 swing together.

Thereafter, a follower pin 22 fixed to the frame member 8 is guided to a cam groove formed in the rack main body and a slide member (not shown) that advances and retreats together with the rack main body, and then an ascending and descending mechanism of the frame member 8 operates. That is, when the rack main body further retreats, the follower pin 22 is guided along the inclination portion of the cam groove to ascend, and accordingly the frame member 8 and the clamping head 7 begin to ascend.

In addition, chucking pawls 7a of the clamping head 7 come into contact with the opening end of the center hole Da of the disc D. When the clamping head 7 further ascends, the chucking pawls 7a push the disc D up to push the opening end of the center hole Da against a projection 2b of the opening 2a in the chassis case 2. Then, the clamping head 7 is fitted into the center hole Da of the disc D, and the chucking pawls 7a lock the opening end of the disc D. That is, the disc D is fixed on the turntable 10, and the clamping is performed.

After the clamping head 7 clamps the center hole Da of the disc D, if the rack main body slightly retreats, the disc support arm 17 also slightly swings, and then the chucking of the disc D by the holder 18 is released. When the chucking of the disc D by the holder 18 is released, in order to suppress the rattling of the disc support arm 17, the stopper 19 attached to the front end of the disc support arm 17 comes into sliding contact with a fixing portion 23 of an inner wall of the apparatus to fix the position of the disc support arm 17. At this time, the leading arm 21 swings slightly in synchronization with the stopper, and the chucking of the disc D is released. In addition, in the ascending and descending mechanism of the frame member 8, the follower pin 22 descends slightly in the cam groove to be in a state in which the disc D can rotates. That is, the clamping operation is finished.

The operational aspect of the disc apparatus 1 in loading a disc D has been described hitherto. However, in unloading a disc D, the respective components perform reverse operations to follow a path reverse to the above-mentioned path. That is, the conveyance mechanism is driven reversely to advance the rack main body, and then the disc support arm 17 swings forward. The disc support arm 17 swings to the position illustrated by the solid line in FIG. 2, and then about half of the disc D is ejected from the slot 3a to complete the unloading.

In addition, in the disc apparatus 1 described above, in order to prevent errors in information recording or reproducing due to dust and the like that enters the chassis case 2 from the slot 3a and adheres to the optical pickup 12 or the disc D, a flexible sheet that covers the slot 3a is attached to the rear surface of the front bezel 3 to maintain the air-tightness of the chassis case 2. The flexible sheet is composed of, for example, felt and the like.

Next, an example of the structure of the slot 3a and the felt in the front bezel 3 of the disc apparatus 1 that is an embodiment of the present invention will be described based on the accompanying drawings.

Embodiment 1

Figure 3:
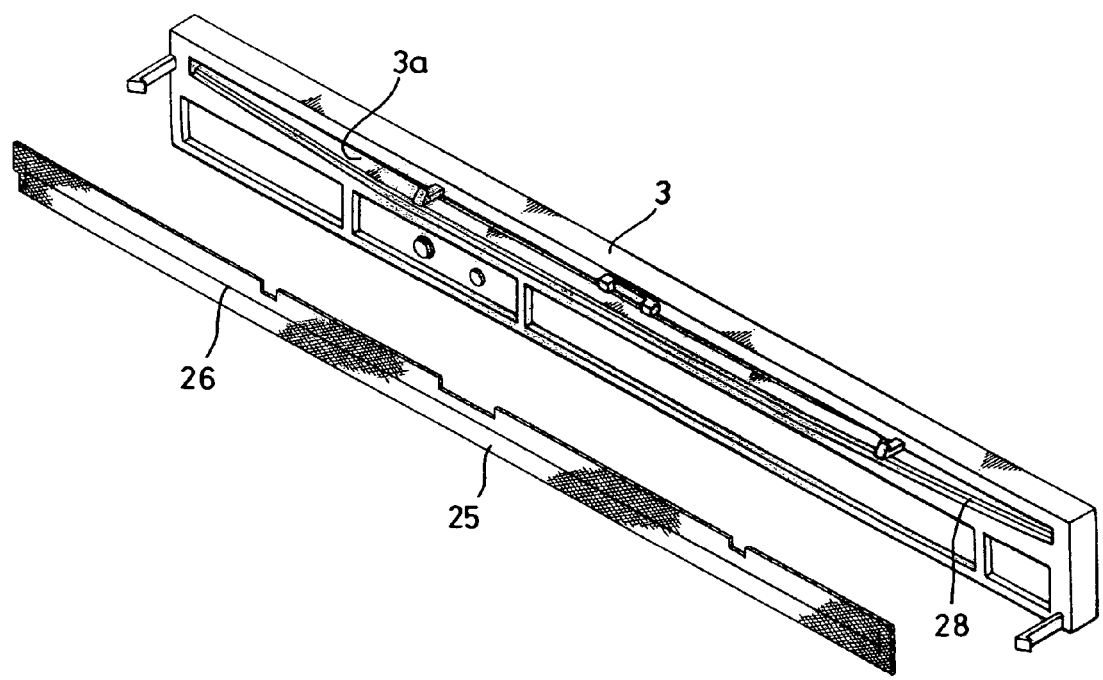
FIG. 3 is an exploded perspective view for explaining the structure of a front bezel in the disc apparatus in FIG. 1.
Figure 4:
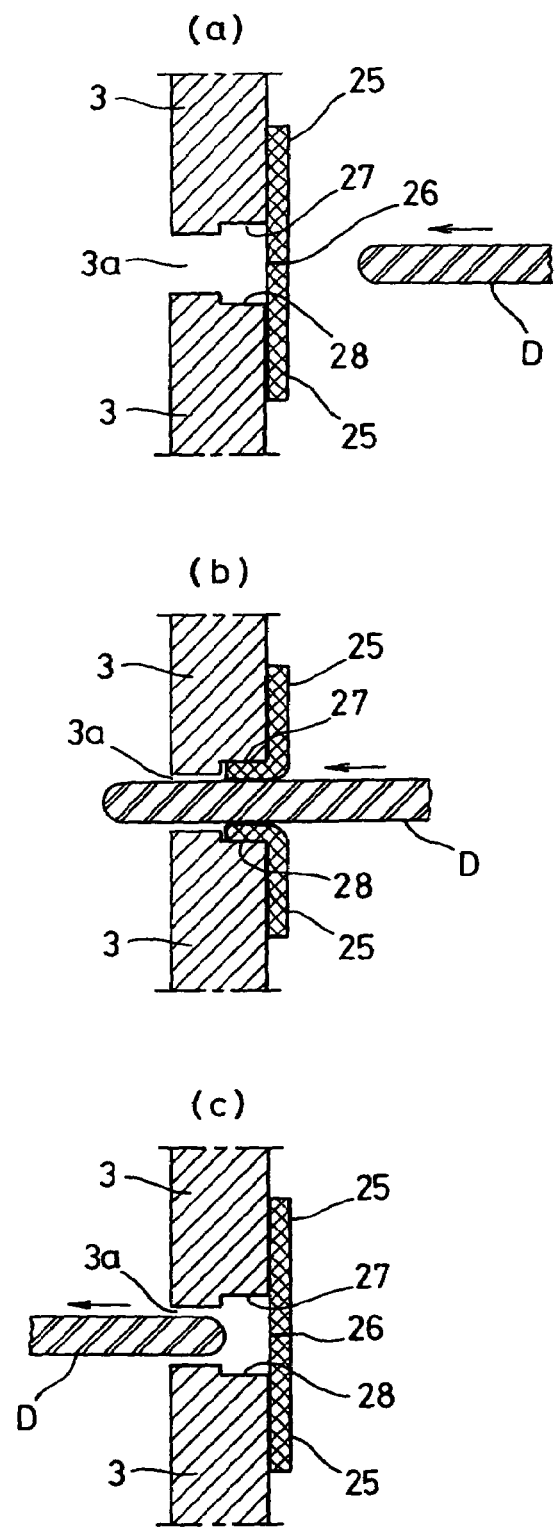
FIG. 4 is a cross-sectional view of the front bezel in a disc unloading operation in the disc apparatus in FIG. 1.

FIG. 3 illustrates an exploded perspective view of the front bezel 3 of the disc apparatus 1 in FIG. 1, and FIG. 4 illustrates a cross-sectional view of the front bezel 3 in the operation of unloading the disc D in the disc apparatus 1 in FIG. 1.

As shown in FIGS. 3 and 4, the front bezel 3 has the felt 25 attached to its backside for the main purpose of control of dust. The felt 25 is fixedly attached to the upper and lower positions of the slot 3a on the backside of the front bezel 3 with double-coated tapes. The felt 25 may be attached with adhesives or screws, etc. With this configuration, the felt 25 is deformed with its upper and lower fixed portions as fulcrums.

In addition, the felt 25 has a horizontal slit 26 longer than the diameter of the disc D for disc-insertion in its center, and discs D pass through this horizontal slit 26. The elasticity of the felt 25 always shuts the horizontal slit 26 to cover the slot 3a except when a disc D is being inserted or ejected. Therefore, dust cannot enter the apparatus from the outside. In addition, FIG. 4A illustrates a state of the felt 25 before the ejection of the disc D, and FIG. 4B illustrates a state of the felt 25 in the middle of the ejection of the disc D, and FIG. 4C illustrates a state of the felt 25 right after the ejection of the disc D.

In addition, the edges of the slot 3a on the backside of the front bezel 3 are formed with an upper recess 27 and a lower recess 28 that receive the upper and lower felts 25 along the longitudinal direction of the slot 3a.

The upper recess 27 and the lower recess 28 formed along the longitudinal direction of the slot 3a are formed at the edges (the upper end and the lower end) of the slot 3a on the backside of the front bezel 3 so that, when the disc D pushes over the felt 25 in the ejection direction (left in FIG. 4) to pass through the slot 3a in the middle of the ejection of the disc D, the pushed-over the upper and lower felts 25 is received. Therefore, the contact pressure on the contact portion between the felt 25 and both the surfaces of the disc D can be decreased even when the felt 25 is deformed to roll into the slot 3a together with the disc D, because the deformed felt 25 is received in the upper recess 27 and the lower recess 28.

More specifically, in FIG. 4B, the upper and lower felts 25 are pushed over by the disc D because the disc D pushes the felt 25 open to pass through the horizontal slit 26. In this case, the pushed-over upper and lower felts 25 are received in the upper recess 27 and the lower recess 28 formed at the upper edge and the lower edge of the slot 3a on the backside of the front bezel 3. Therefore, as clear from FIG. 4B, the felt 25 is not strongly compressed between the contact portion with the disc D and the edge of the slot 3a, and the contact pressure on the contact portion between the felt 25 and both surfaces of the disc D can be decreased. Therefore, sliding scratches that may happen on the signal recording surface of the disc or excessive loads exerting on the disc unloading mechanism of the disc apparatus 1, specifically the disc support arm 17 or the loading motor 24 etc. can be alleviated. Therefore, a stable disc unloading operation can be performed.

Figure 5:
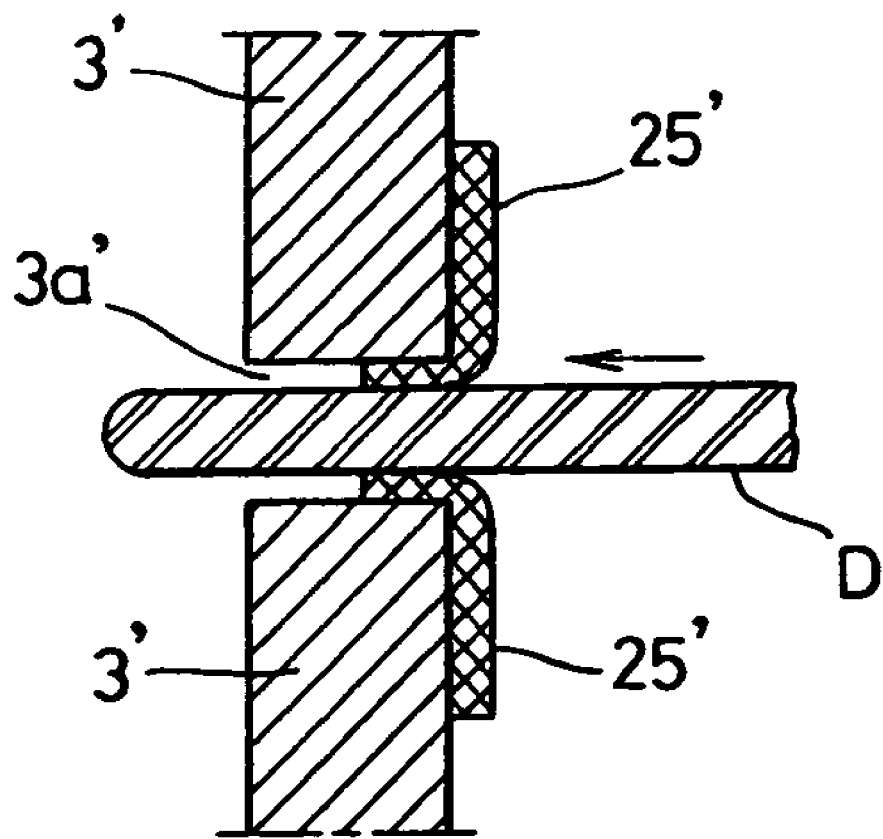
FIG. 5 is a cross-sectional view of the front bezel in the middle of the disc ejection when an upper recess and a lower recess are not formed in an upper end and a lower end of the slot in the front bezel in the disc apparatus in FIG. 1.

On the other hand, FIG. 5 illustrates a cross-sectional view of the front bezel 3' in the middle of the ejection of a disc D when the upper recess and the lower recess described above are not formed on the upper edge and the lower edge of the slot on the backside of the front bezel. In FIG. 5, when the disc D pushes a felt 25' open and passes through the slot 3a', the felt 25' is deformed to roll into the slot 3a' together with the disc D so as to be pushed over in the ejection direction. Therefore, the felt 25' are strongly compressed between the contact portion with the disc D and the edge of the slot 3a', and thus the contact pressure on the contact portion between the felt 25' and both surfaces of the disc D can be increased. Therefore, it can be understood from FIG. 5 that the friction force to the disc D becomes larger, and sliding scratches happen on the signal recording surface of the disc, and excessive loads exert on the disc unloading mechanism of the disc apparatus.

As described above, the reason why the contact pressure on the contact portion between both surfaces of the disc D and the felt 25' and the friction force to the disc become large in disc ejection is that the vertical width of the slot 3a' is not large enough for the thickness of the disk D. However, it is not preferable to make the vertical width of the slot 3a' large because the vertical width of the slot 3a' is required to be as small as possible to control the height of the disc D when an operator begins to insert the disc. Therefore, in the present embodiment, as shown in FIG. 4, in order to alleviate the contact pressure on the contact portion between the felt 25 and both surfaces of the disc D in disc ejection while the vertical width of the slot 3a height is made as small as possible, the upper end and the lower end of the slot 3a on the backside of the front bezel 3 are formed with the upper recess 27 and the lower recess 28 that receive the pushed-over upper and lower felts 25. Also, the pushed-over felt 25 is received in the upper recess 27 and the lower recess 28, so that the contact pressure on the contact portion between both surfaces of the disc D and the felt 25 becomes small. Therefore, the vertical width of the slot 3a can be decreased, and the height of the disc can be satisfactorily controlled in disc insertion.

In addition, in the present embodiment, the upper recess 27 and the lower recess 28 that receive the upper and lower felts 25 are formed along the whole longitudinal edge (the upper end and the lower end) of the slot 3a. However, the slot 3a is shaped to have its middle portion bulged further downward than its both ends in order not to surface-contact with the disc D. Therefore, only the circumferential edge of the disc D comes into contact with the slot 3a. In addition, the vertical width of the slot 3a becomes the minimum at the both ends. Therefore, the upper recess and the lower recess may be formed only at the edge of both ends of the slot 3a. In addition, in the present embodiment, the recesses are formed at both the upper and the lower edges of the slot 3a. However, only either the upper or the lower recess may be formed. That is, it will be satisfactory that either the upper or lower recess is properly formed at a location where the contact pressure on the contact portion between the disc D and the felt 25 is required to be small in the ejection of a disc D.

Embodiment 2

Next, another example of the structure of the slot 3a and the felt in the front bezel 3 of the disc apparatus according to the embodiment of the present invention will be described with reference to the accompanying drawings. In addition, new reference numerals will be used, for example 29 for the front bezel instead of 3, 29a for the slot instead of 3a, and 30 for the felt instead of 25.

Figure 6:
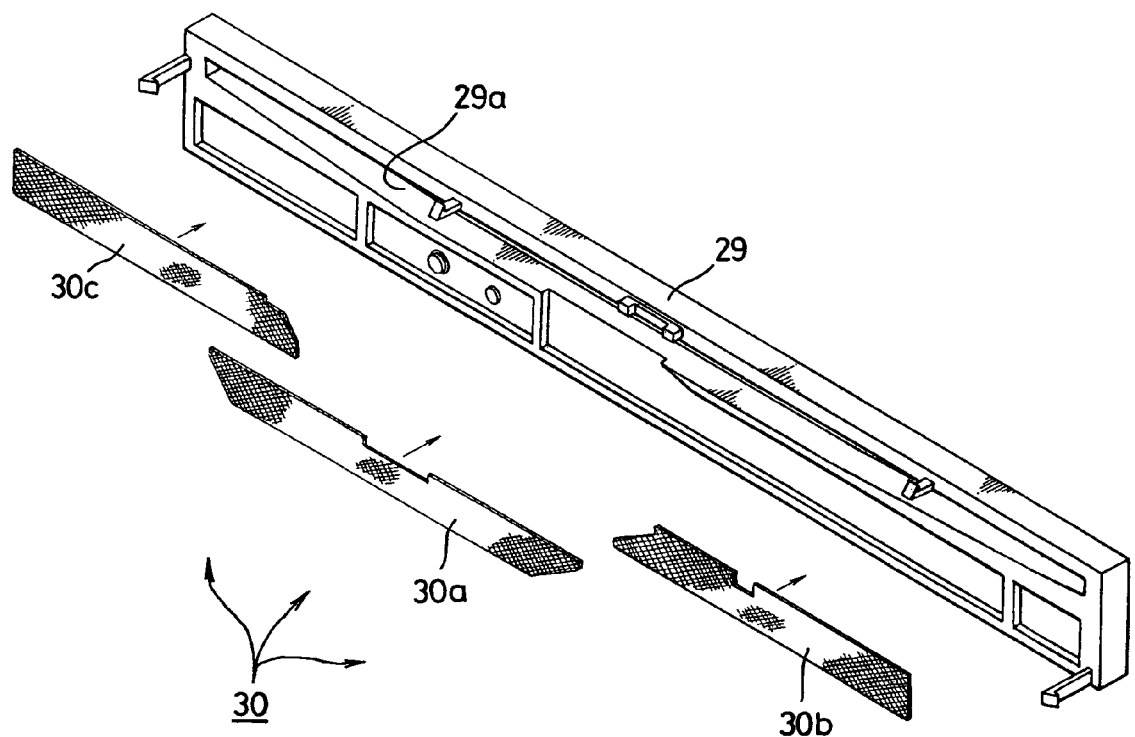
FIG. 6 is an exploded perspective view for explaining the structure of other front bezel in the disc apparatus in FIG. 1.
Figure 7:
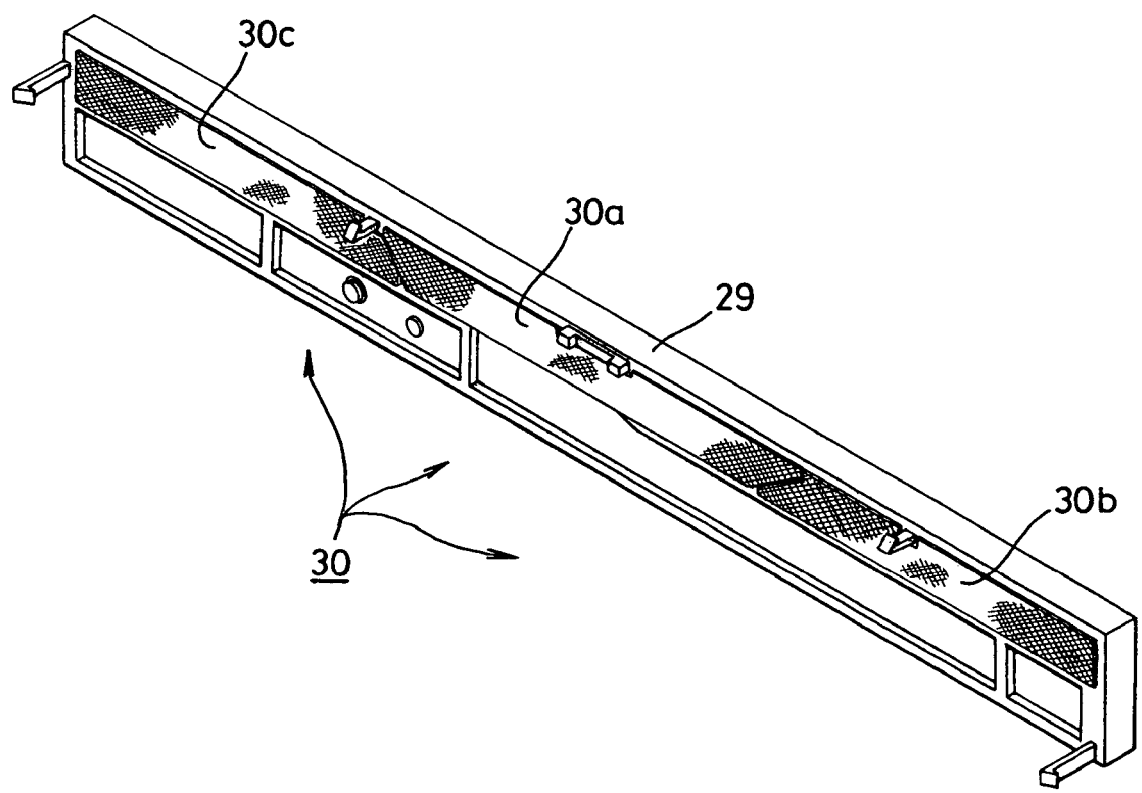
FIG. 7 is a perspective view of a backside of the front bezel in FIG. 6.

FIG. 6 illustrates an exploded perspective view of the front bezel 29, and FIG. 7 illustrates a perspective view of the backside of the front bezel 29.

As shown in FIG. 6, the front bezel 29 has a plurality of divided felts 30 for the main purpose of control of dust attached on its backside. In FIG. 6, the middle portion of the front bezel 29 is covered with an upper felt 30a. The upper felt 30a is fixedly attached to an upper position of the slot 29a on the backside of the front bezel 29 with double-coated tapes. In addition, both portions adjacent to the middle portion of the slot 29a are covered with a lower felt 30b and a lower felt 30c. The lower felt 30b and the lower felt 30c are fixedly attached to lower positions of the slot 29a on the backside of the front bezel 29, respectively. The felts may be attached with adhesives or screws etc. This deforms the upper felt 30a with its portion fixed to the upper position as a fulcrum, and deforms the lower felt 30b and the lower felt 30c with their portions fixed to the lower positions as fulcrums.

In addition, as clear from FIG. 7, the upper felt 30a and the lower felts 30b and 30c are disposed in the vertical direction of the slot 29a of the front bezel 29. Therefore, the elasticity of the felts always makes the felts shut the slot 29a reliably except when the disc D is being inserted or ejected. Therefore, dust cannot enter from the outside.

Figure 8:
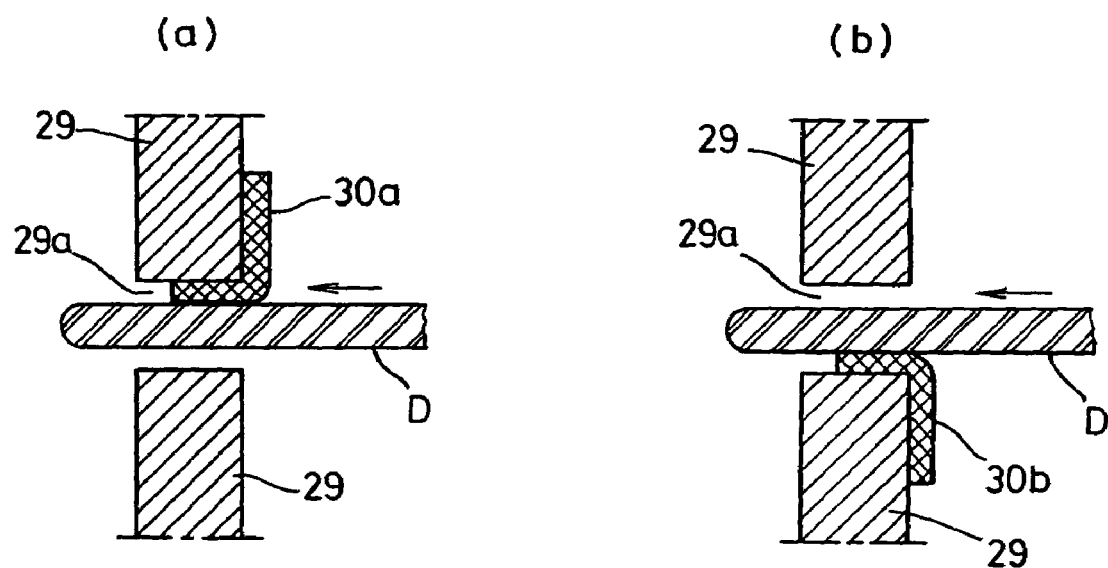
FIG. 8 is a cross-sectional view of the front bezel in the disc unloading operation in the disc apparatus in FIG. 1 in which the front bezel in FIG. 6 is attached.

FIG. 8 illustrates a cross-sectional view of the front bezel 29 in the operation of unloading the disc D. FIG. 8A is a cross-sectional view of the upper felt 30a of the front bezel 29 in the operation of ejecting the disc D. In FIG. 8A, the upper felt 30a is pushed over by the disc D because the disc D pushes over the upper felt 30a in the ejecting direction (left in the figure) to pass through the slot 29a. In this case, the upper felt 30a is not strongly compressed between the upper surface (level surface) of the disc D and the edge (the upper end) of the slot 29a because there is a space between the lower surface (signal recording surface) of the disc D and the edge (the lower end) of the slot 29a even when the upper felt 30a is deformed to roll into the slot 29a together with the disc D. Thus, only the upper surface of the disc D comes into contact with the upper felt 30a, so that the contact pressure on the contact portion can be alleviated. Therefore, the friction force to the disc D can be alleviated. As a result, excessive load exerting on the disc unloading mechanism of the disc apparatus 1 can be alleviated.

FIG. 8B is a cross-sectional view of the lower felt 30b of the front bezel 29 in the operation of ejecting the disc D. In FIG. 8B, the lower felt 30b is pushed over by the disc D because the disc D pushes over the lower felt 30b in the ejecting direction (left in the figure) to pass through the slot 29a. In this case, the lower felt 30b is not strongly compressed between the lower surface (signal recording surface) of the disc D and the edge (the lower end) of the slot 29a because there is a space between the upper surface (level surface) and the edge (the upper end) of the slot 29a even when the lower felt 30b is deformed to roll into the slot 29a together with the disc D. Thus, only the lower surface of the disc D comes into contact with the lower felt 30a, so that the contact pressure on the contact portion can be decreased. Therefore, the friction force to the disc D can be decreased. As a result, excessive load exerting on the disc unloading mechanism of the disc apparatus 1 can be alleviated. In addition, the same effect can be obtained in the lower felt 30c.

As described above, in the present embodiment, the upper felt 30 is attached to the upper position in the middle of the slot 29a, and the lower felts 30b and 30c are attached to the lower position in both portions adjacent to the middle portion of the slot 29a in order to alleviate the contact pressure on the contact portion between the felt 30 and both surfaces of the disc D in disc ejection. That is, the felt 30 is divided into the upper felt 30a and the lower felts 30b and 30c, and then attached to the slot 29a along the longitudinal direction so that only one surface, not both surfaces, of the disc D comes into contact with the felt 30 when the disc D pushes the felt 30 open to pass through the slot 29a. Also, since only either upper or lower surface of the disc D comes into contact with the felt 30 along the longitudinal direction of the slot 29a, the friction force to the disc D is dispersed, and consequently, the friction force becomes small. Therefore, sliding scratches can be prevented from happening on the signal recording surface of the disc D even in the insertion of the disc D as well as in the ejection of the disc D.

In addition, the present embodiment does not have such a configuration in which a long horizontal slit for disc insertion is formed in the middle of the felt and the disc D pushes the felt open to pass through the slot from the horizontal slit for disc insertion. Therefore, compared with such a configuration, the length of the upper felt 30a and the lower felts 30b and 30c that roll into the slot 29a together with the disc D in the disc ejection becomes large. As a result, even when the disc D deviates from the regular position in the ejection of the disc D, for example, even when the disc D deviates from the right height and passes through the slot 29a while it is disposed to incline upward or downward, not disposed horizontally, the disc D rarely comes into contact with the edge of the slot 29a on the backside of the front bezel 29 because the disc D comes into contact with the upper felt 30a or the lower felts 30b and 30c. Accordingly, the disc D can be protected from scratches that may happen on the signal recording surface from the contact between the signal recording surface of the disc D and the edge of the slot 29a, and thus the signal recording surface of the disc D can be protected.

In addition, in the present embodiment, the felt 30 which is divided into three portions along the longitudinal direction of the slot 29a and the upper felt 30a and the lower felts 30b and 30c are fitted on the backside of the front bezel 29. However, the felt 30 may be divided into a more number of portions. For example, the felt can be divided into five portions such as an upper felt in the middle of the slot 29a, and lower felts in the portions adjacent to the middle portion, and further, upper felts in the ends of the slot 29a adjacent to the lower felts, and be attached to the backside of the front bezel 29.

Embodiment 3

Next, still another example of the structure of the slot 3a and the felt in the front bezel 3 of the disc apparatus 1 according to the embodiment of the present invention will be described with reference to the accompanying drawings. In addition, new reference numerals will be used, for example, 31 for the front bezel instead of 3, 31a for the slot instead of 3a, and 32 for the felt instead of 25.

Figure 9:
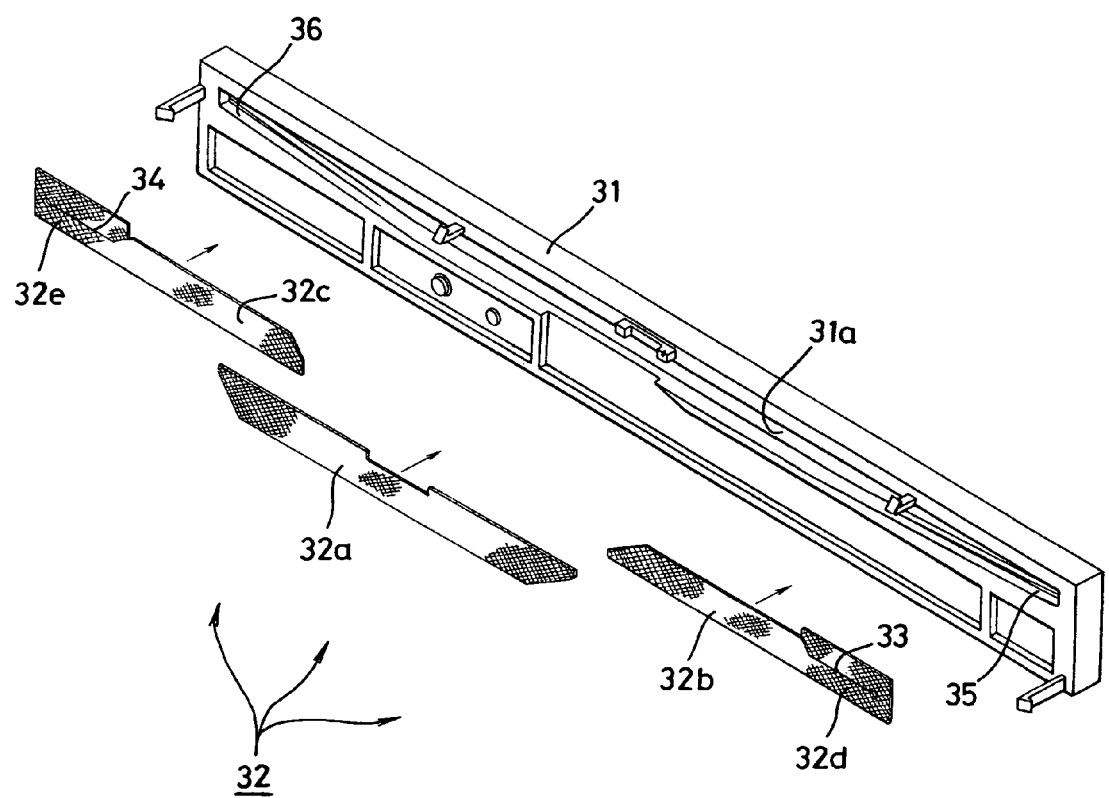
FIG. 9 is an exploded perspective view for explaining the structure of other front bezel in the disc apparatus in FIG. 1.
Figure 10:
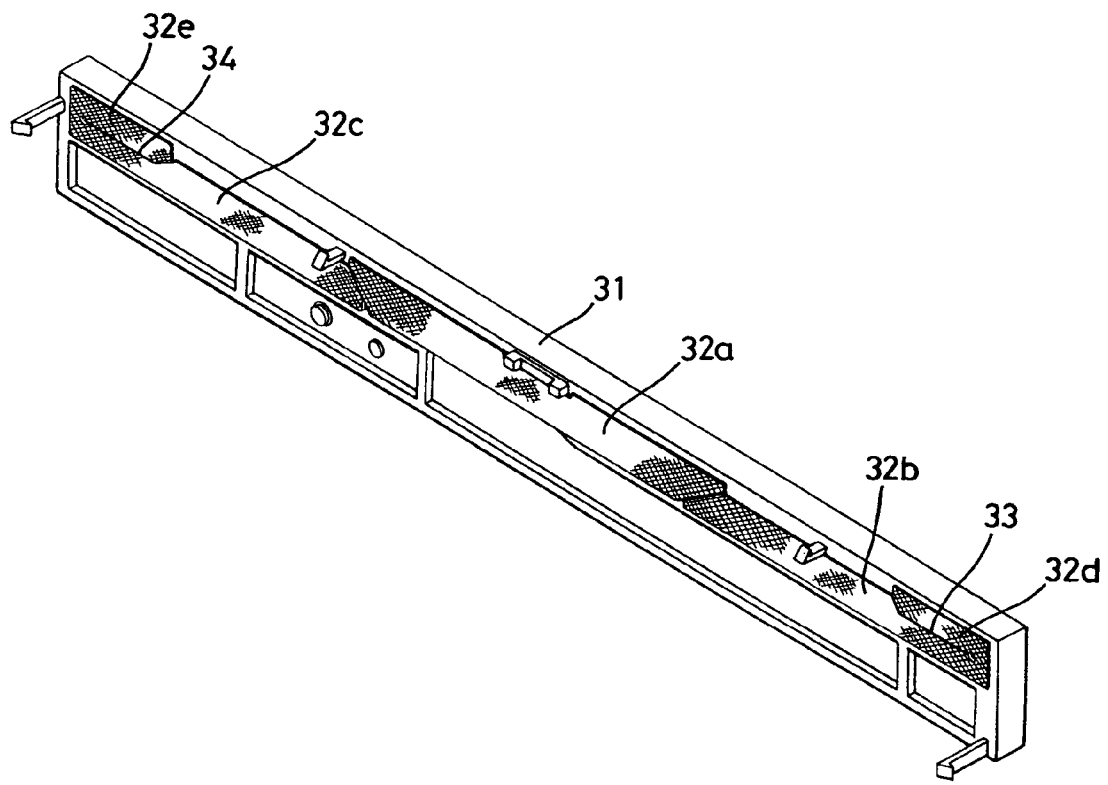
FIG. 10 is a perspective view of the backside of the front bezel in FIG. 9.

FIG. 9 illustrates an exploded perspective view of the front bezel 31, and FIG. 10 illustrates a perspective view of the backside of the front bezel 31.

As shown in FIGS. 9 and 10, a plurality of the divided felts 32 for the main purpose of control of dust is attached to the front bezel 31. The middle portion of the slot 31a in the front bezel 31 is covered with an upper felt 32a. The upper felt 32a is fixed to upper positions of the slot 31a on the backside of the front bezel 31 with double-coated tapes. Therefore, the upper felt 32a is deformed with its portion fixed to the upper position as a fulcrum.

In addition, both portions adjacent to the middle portion of the slot 31a are covered with lower felts 32b and 32c. The lower felts 32b and 32c are respectively fixedly attached to lower positions of the slot 31a on the backside of the front bezel 31. Therefore, the lower felts 32b and 32c are deformed with their portions fixed to the lower positions as fulcrums.

Furthermore, both ends of the slot 31a are covered with upper and lower felts 32d and 32e. The upper and lower felts 32d and 32e are fixedly attached to the upper and lower positions of the slot 31a on the backside of the front bezel 31 with double-coated tapes. In addition, since horizontal slits 33 and 34 for disc insertion through which the circumferential edge of the disc D passes are formed in the middle of the felt 32, the upper and lower felts 32d and 32e are deformed with their portions fixed to the upper and lower positions as fulcrums.

In addition, the edges of both ends (the upper end and the lower end) of the slot 31a are formed with an upper recess (not shown) and lower recesses 35 and 36 that receive the upper and lower felts 32d and 32e. Therefore, the contact pressure on the contact portion between the upper and lower felts 32d and 32e near the circumferential edge of the disc D can be decreased even when the upper and lower felts 32d and 32e are deformed to roll into the slot 31a, because the upper recess and the lower recesses 35 and 36 receive the deformed upper and lower felts 32d and 32e.

As described above, in the present embodiment, in order to alleviate the contact pressure on the contact portion between both surfaces of the disc D and the felt 32 in disc ejection, the felt is divided into the upper felt 32, the lower felt 32b, and the lower felt 32c correspondingly to longitudinal positions of the slot 31a to make only one surface of the disc D come into contact with the felt 32 in the portions other than both edges of the slot 31a. Also, since either the upper surface or the lower surface of the disc D comes into contact with the felt 32 to pass through the slot 31a correspondingly to the longitudinal positions of the slot 31a, the friction force to the disc D is dispersed, and consequently, the friction force becomes small. As a result, the disc D can be protected from sliding scratches that may happen on the signal recording surface of the disc D even in the insertion of the disc D.

In addition, the slot 31a is shaped to have its middle portion bulged further downward than its both ends in order not to surface-contact the disc D. As a result, only the circumferential edge of the disc D comes into contact with the slot 31a. Also, since the vertical width of both ends of the slot 31a is small, the circumferential edge of the disc D comes into contact with the edges of the slot 31a on the backside of the front bezel 31 when the disc D begins to be unloaded. Therefore, in the present embodiment, the upper and lower felts 32d and 32e are attached to both ends of the slot 31a so that the circumferential edge of the disc D does not come into contact with the edges of the slot 31a on the backside of the front bezel 31 in unloading the disc D. Also, in order to alleviate the contact pressure on the contact portion between the disc D and the upper and lower felts 32d and 32e near the circumferential edge of the disc D in the ejection of the disc D, the edges of both ends of the slot 31a are formed with the upper recess 35 and the lower recess 36 that receive the upper and lower felts 32d and 32e. As a result, the contact pressure on the contact portion between the disc D and the upper and lower felts near the circumferential edge of the disc D can be decreased because the upper recess 35 and the lower recess 36 receive the pushed-over upper and lower felts 32d and 32e.

As described above, in the present embodiment, sliding scratches that may happen on the signal recording surface of the disc D or excessive loads exerting on the disc unloading mechanism of the disc apparatus 1 can be alleviated, and thus a stable disc unloading operation can be performed.

So far, the embodiments of the present invention have been described. However, the present invention is not limited to the embodiments illustrated in the accompanying drawings, and various modifications can be made based on the technical idea of the present invention.

What is claimed is:

1. A disc apparatus having a front bezel, in which a disc insertion opening is covered with a plurality of flexible portions, and a disc is inserted or ejected by pushing over the plurality of flexible portions, wherein the plurality of flexible portions comprises at least three flexible portions including at least one upper flexible portion and at least one lower flexible portion;

wherein the upper flexible portion and the lower flexible portion are disposed adjacently along a longitudinal direction of the disc insertion opening, in the vertical direction of the disc insertion opening and on the backside of the front bezel;

wherein an upper portion of the upper flexible portion is fixedly attached to an upper position of the disc insertion opening on the backside of the front bezel, and a lower portion of the lower flexible portion is fixedly attached to a lower position of the disc insertion opening on the backside of the front bezel; and wherein the upper flexible portion is contacted by an upper surface of the disc when the upper flexible portion is pushed over by contact with the disc and the lower flexible portion is contacted by a lower surface of the disc when the flexible portion is pushed over by contact with the disc.

2. The disc apparatus according to claim 1, wherein the disc insertion opening of the front bezel has its backside height larger than its front side height.

3. The disc apparatus accordingly to claim 1, wherein the disc insertion opening comprises its middle portion bulged further downward than its both ends, wherein the plurality of flexible portions comes into contact with both surfaces of the disc at the both ends of the disc insertion opening, and comes into contact with only either an upper surface or lower surface of the disc at other than the both ends of the disc insertion opening when the plurality of flexible portions is pushed over by the contact of the disc.

4. The disc apparatus according to claim 3, wherein the edges of the both edges of the disc insertion opening are provided with recesses that receive the flexible portions pushed over by the contact of the disc in disc ejection.

\* \* \* \* \*